(12) United States Patent
Ernster

(10) Patent No.: US 6,797,298 B2
(45) Date of Patent: Sep. 28, 2004

(54) METHOD OF MAKING A FOOD PRODUCT COLORANT

(76) Inventor: John H. Ernster, 796 Via Somonte, Palos Verdes Estates, CA (US) 90274

( * ) Notice: Subject to any disclaimer, the term of this patent is extended or adjusted under 35 U.S.C. 154(b) by 143 days.

(21) Appl. No.: 09/745,051

(22) Filed: Mar. 12, 2001

(65) Prior Publication Data

US 2001/0046546 A1 Nov. 29, 2001

Related U.S. Application Data

(60) Provisional application No. 60/172,639, filed on Dec. 20, 1999.

(51) Int. Cl.$^7$ .................................................. A23L 1/27
(52) U.S. Cl. ........................ 426/250; 426/540; 426/582
(58) Field of Search .................................. 426/250, 582, 426/664, 580, 540, 519

(56) References Cited

PUBLICATIONS

Luck et al., AN 73(11):P1639 FSTA, abstracting South African Journal of Dairy Technology, 1972, 4(4), 207–213.*
Excel Colors ExcelPro Inc., 1995.

* cited by examiner

Primary Examiner—Leslie Wong
(74) Attorney, Agent, or Firm—Paul M. Denk

(57) ABSTRACT

Butter oil (anhydrous milk fat) is used as appropriate carrier of carotenal solution, formed of Excelcolor, for use as a colorant in food products.

9 Claims, 1 Drawing Sheet

METHOD OF MAKING A FOOD PRODUCT COLORANT

CROSS-REFERENCE TO RELATED APPLICATION

This application is a non-provisional patent application based upon provisional patent application having Ser. No. 60/172,639, filed on Dec. 20, 1999.

STATEMENT REGARDING FEDERALLY SPONSORED RESEARCH OR DEVELOPMENT

N/A

BACKGROUND OF THE INVENTION

This invention relates principally to the use of butter oil (anhydrous milk fat) as an appropriate carrier of carotenal solution for use as a colorant in food products.

As is known in the trade, natural carotenal is a somewhat seasonally available product, and this is significant in the availability of such compound when used in continuous overall production of food products. For example, the application of carotenal in the processing of American cheese is a primary example.

Hence, investigation has determined that when synthetic carotenal is well mixed with the natural beta carotene in a butter oil, and stored for thirty (30) days, the Excel colorant is a far more efficient colorant than the colorant derived from synthetic carotenal as made by the various chemical companies.

It is known that the units of vitamin A color derived from natural beta carotene in a pound of butter oil is approximately I.U. 17,025. The units of vitamin A color in synthetic carotenal is made available by Roche Vitamins, Inc., of Parsippany, N.J. 07054, in Solution No. 73, and is 30% beta carotene and 70% eta-a.p.o.-8' carotenal. This combination has an I.U. measurement of 12,167,200 of the total carotenal. Or, the beta carotene of the compound is I.U. 3.650,160, and the beta beta-a.p.o.-8' carotenal measures I.U. 8,517, 040. If utilizing a cost analysis of the usage of the available compound, the use of said compound calculates at a cost of $1.386 per pound of butter oil, which computes to a cost of $0.00081409 per I.U. The cost of the Solution No. 73 available from Roche is $25.75 per kilogram, so in converting that cost per I.U., you calculate a cost of $0.00000095996 per I.U. While thes costs per I.U. seem infinitesimal, one must recognize that, on the average, it takes 0.4 grams, or I.U. 10,720, of colorant per pound of processed cheese to develop the usually preferred color for the processed cheese. Hence, if you use thirty pounds of the invention, referred to as Excelcolor, with an I.U. 357,333 per pound, you have a I.U. 10,719,999, or the proper I.U. of carotenal for 1,000 pounds of processed American cheese. This would cost approximately $130.67 for Excelcolor.

If one utilizes the Roche Solution No.73, the cost is $137.21, for 1,000 pounds of processed American cheese. Thus, there is a savings of $6.54 per 1,00 pounds of cheese. While this may seem insignificant, one must recognize that there are at least two companies currently in the United States that process and make over one million pounds of processed cheese per day. Hence, the usage of Excelcolor in the manner as described, would represent a savings of $6,540.00 per day, or over $2,000,000 per year, to the processor.

DESCRIPTION OF THE PREFERRED EMBODIMENT

Figure 1:
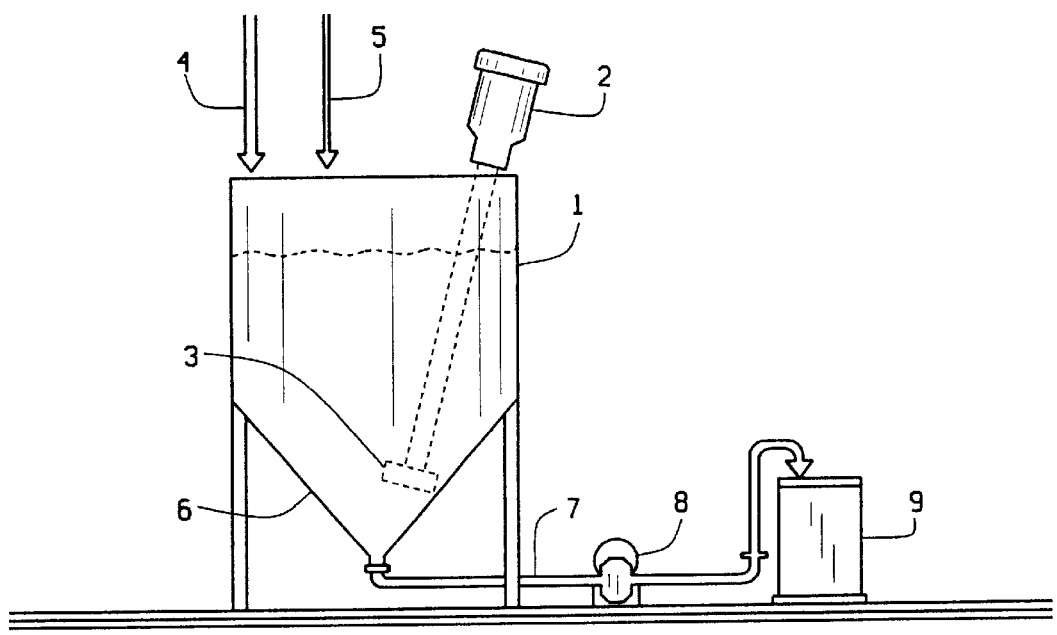
FIG. 1 is a schematic view of the mixing vessel and high speed mixer, plus flow lines, for use in preparation of the Excel color composition of this invention.

The foregoing analysis of the use of synthetic carotenal, such s the Roche Solution No.73, is notwithstanding the phenomenon that in usage of the current invention it has been determined that when synthetic carotenal is well mixed with natural beta carotene, in butter oil, and stored for thirty days, the Excelcolor is a far more efficient colorant, than the Roche Solution No. 73, as used by itself.

In making Excelcolor, it has been found that mixing it with Roche Solution No. 73 in proportion within the butter oil, with a high intensity mixer, is a very satisfactory way to intensify its coloring ability. It has also been determined rather important that the Excelcolor be added for thirty days. The reason for this is that the increase in coloring appears to be enhanced because while the carotenal crystals are finely milled, they are still more finely dispersed by the dissolving process in the natural carotene environment, allowing a finer visual reception of the color, thereby becoming a more efficient colorant. It is also important to note that since Excelcolor is less concentrated, by this method of production, the large users using preblending techniques get a more homogeneous color prior to the cooking operation.

An example of the Excelcolor product, and its processing, as used in this invention, is as follows.

An example of the usage of the current invention in the processing of cheese, the following information is provided.

The use of this development in processed cheese may be varied to arrive at the desired color, required by the manufacturer, or preferred by the customer. However, the preferred average color would require approximately 30 pounds of Excel color, combined in each 1,000 pounds of processed cheese. Excel color is the final formulation for this composition as explained herein.

Since most big processors usually preblend the ground cheese, and some of its minor ingredients, such as salt, emulsifying sales, and color, in large blenders, it could be put into that blending premix in larger quantities, and hence facilitate a homogenous mix going into the cooker. The average time required to cook the cheese is approximately six minutes, and you maintain violent agitation while heating the ground cheese and other minor ingredients to 170° F.–180° F., for discharge into a cooker receiver.

In the actual mixing of the composition, 4,000 pounds of butter oil (anhydrous milk fat), a source of natural carotenes, at 160° F., containing I.U. 68,100,000 beta carotene, is put into a vat. In addition, 110 pounds of a commercially vailable colorant, Roche Solution No. 73 (Roche Vitamins, Parsippany, N.J.), at 160° F., containing 30% synthetically produced beta carotene and 70% synthetically produced beta-a.p.o.-8' carotenal or I.U. 401,500,000 units of beta carotene, and I.U. 936,800,000 beta-a.p.o.-8' carotenal per 110 pounds, are mixed into the vat. This provides a batch of the above stated ingredients in the amount of 4,110 pounds. The vat has a high speed Hi Sheer Mixer, and mixes the composition for 30 minutes. Following this, the mixture is pumped into a 400 pound steel drum and is stored for 30 days at amibient temperature, as in a warehouse. It is this mixture that is then mixed with the various cheeses to make processed cheese for preparation of the cheese for packaging and marketing.

As can be seen in FIG. 1, the drum 1 is disclosed, the mixer 2, having a blade at its lower end 3 to produce high sheer mixing, is also disclosed. The incoming lines 4, as for the butter oil, and 5, for the Roche solution, are also disclosed. The bottom of the drum is inclined, at 6, to provide for ease of flow of the mixture into the pipeline 7, which is pumped by the pump 8, and transferred into the 400 pound steel lined drums 9, to complete the mixing process, and to provide for storage.

Variations or modification to the subject matter of this invention may occur to those skilled in the art upon reviewing the invention as described herein. Such variations, if within the spirit of this development, are intended to be encompassed within the scope of the invention as defined. The description of the preferred embodiment, particularly as set forth in examples, is done so for illustrative purposes only.

Having thus described the invention, what is claimed and desired to be secured by letters patent is:

1. A method of making a premix colorant for producing processed cheese, comprising:

combining butter oil, beta carotene, and carotenal;

mixing said combination together in a high speed mixer;

mixing said combination in said mixer for approximately 30 minutes; and storing said mixture for a period of approximately 30 days at ambient temperature, to provide a processed cheese premix colorant.

2. The method of claim 1 and further including:

cooking a batch of processed cheese within a cooker;
   agitating said cooking cheese;
      adding a quantity of said premix colorant into the cooker while agitating the cheese;
      cooking the mixture for approximately 6 minutes, at a temperature between about 170° F.–180° F.; and
      pouring the mixture into a mold for cooling.

3. The method of claim 2 wherein the premix colorant comprises approximately 4,000 pounds of butter oil containing natural beta carotene and approximately 110 pounds of a prepare solution containing approximately 30% beta carotene and approximately 70% beta-a.p.o.-8'-carotenal, thereby yielding approximately 4,110 pounds of said premix colorant.

4. The method of claim 1 wherein the butter oil, beta carotene and carotenal each are at approximately 160° F. when combined.

5. The method of claim 1 wherein the butter oil contains approximately I.U. 17,025 beta carotene per pound.

6. A method of making a processed cheese product comprising:

(a) preparing a premix colorant by:
      (1) combining a natural source of beta carotene and a combination of 30% synthetic beta carotene and 70% beta-a.p.o.-8'-carotenal;
      (2) mixing said combination together in a high speed mixer;
      (3) mixing said combination in said mixer for approximately 30 minutes; and
      (4) storing said mixture for a period of at least 30 days at ambient temperature, to provide a processed cheese premix colorant:

(b) cooking a batch of processed cheese within a cooker;

(c) agitating said cooking cheese;

d) adding a quantity of said premix colorant into the cooker while agitating the cheese;

(e) cooking the mixture for approximately 6 minutes, at a temperature between about 170° F.–180° F.; and (f) pouring the mixture into a mold for cooling.

7. The method of claim 6 wherein said natural source of beta carotene is butter oil.

8. The method of claim 7 wherein said said premix colorant comprises 4000 pounds of butter oil and 110 pounds of said combination 30% synthetic beta carotene and 70% beta-a.p.o.-8'-carotenal.

9. The method of claim 6 wherein in the step of combining a natural source of beta carotene and a combination of 30% synthetic beta carotene and 70% beta-a.p.o.-8'-carotenal comprises combining said ingredients at 160° F.

\* \* \* \* \*